(12) United States Patent
Anzai (10) Patent No.: US 11,761,497 B2
(45) Date of Patent: Sep. 19, 2023

(54) TWO-WAY CLUTCH

(71) Applicant: SUGATSUNE KOGYO CO., LTD., Tokyo (JP)

(72) Inventor: Tadashi Anzai, Tokyo (JP)

( * ) Notice: Subject to any disclaimer, the term of this patent is extended or adjusted under 35 U.S.C. 154(b) by 106 days.

(21) Appl. No.: 17/593,415

(22) PCT Filed: Feb. 10, 2020

(86) PCT No.: PCT/JP2020/005040
§ 371 (c)(1),
(2) Date: Sep. 17, 2021

(87) PCT Pub. No.: WO2020/189090
PCT Pub. Date: Sep. 24, 2020

(65) Prior Publication Data
US 2022/0170518 A1    Jun. 2, 2022

(30) Foreign Application Priority Data

Mar. 20, 2019    (JP) ................................ 2019-052271

(51) Int. Cl.
*F16D 41/08*    (2006.01)
*F16D 41/067*   (2006.01)

(52) U.S. Cl.
CPC ......... *F16D 41/088* (2013.01); *F16D 41/067* (2013.01)

(58) Field of Classification Search
CPC .............................. F16D 41/088; F16D 41/067
See application file for complete search history.

(56) References Cited

U.S. PATENT DOCUMENTS 6,629,590 B2*  10/2003  Ochab .................... B60K 23/06
                                                     384/526
7,588,112 B2*   9/2009  Ebihara ................. F16D 41/088
                                                      74/650

(Continued)

FOREIGN PATENT DOCUMENTS

CN    102287459 A    12/2011
CN    102705400 A    10/2012
(Continued)

OTHER PUBLICATIONS

WIPO, Japanese International Search Authority, International Search Report (with English translation) and Written Opinion dated Apr. 14, 2020 in International Patent Application No. PCT/JP2020/005040, 9 pages.

(Continued)

*Primary Examiner* — Huan Le
(74) *Attorney, Agent, or Firm* — Masuvalley & Partners; Peter Martinez (57) ABSTRACT

Provided is a two-way clutch capable of making a size in an axial direction thereof compact. A first engaging element and a second engaging element are arranged in a first wedge-shaped space and a second wedge-shaped space between an outer member and an inner member. The first engaging element is held by the first retainer and the first retainer is enabled to swing to the outer member. The second engaging element is held by the second retainer and the second retainer is enabled to swing to the outer member. In a side view orthogonal to an axial direction of the first engaging element and the second engaging element, at least a part of the first engaging element and at least a part of the second engaging element overlap in the axial direction.

12 Claims, 11 Drawing Sheets

(56) References Cited

U.S. PATENT DOCUMENTS

| | | | |
|---|---|---|---|
| 8,857,589 B2* | 10/2014 | Heath | F16D 47/04 |
| | | | 192/48.92 |
| 10,150,369 B2* | 12/2018 | Thornton | F16D 27/112 |
| 2004/0011618 A1 | 1/2004 | Aida | |

FOREIGN PATENT DOCUMENTS

| JP | 2003-083426 A | 3/2003 |
|---|---|---|
| JP | 2006029445 A | 2/2006 |
| JP | 2008-057566 A | 3/2008 |
| JP | 2008-224025 A | 9/2008 |

OTHER PUBLICATIONS

CNIPA/CN, Chinese Office Action dated Sep. 28, 2022 in Chinese Patent Application No. 202080020482.0, 7 pages with translation.

* cited by examiner

TWO-WAY CLUTCH

RELATED APPLICATIONS

This application is the U.S. National Phase of and claims priority to International Patent Application No. PCT/JP2020/005040, International Filing Date Feb. 10, 2020; which claims benefit of Japanese Patent Application No. 2019-052271 filed Mar. 20, 2019; both of which are incorporated herein by reference in their entireties.

TECHNICAL FIELD

The present invention relates to a two-way clutch that locks and unlocks rotation in both directions (clockwise direction and counterclockwise direction).

BACKGROUND

As a two-way clutch of this type, there is known a two-way clutch described in JP-A 2008-057566. This conventional two-way clutch includes an outer member, an inner member arranged inside the outer member, and a first engaging element and a second engaging element arranged between the outer member and the inner member. On an inner surface of the outer member, a plurality of cam surfaces that form a plurality of wedge-shaped spaces between the outer member and an inner member are formed. The first engaging element and the second engaging element are arranged in the plurality of wedge-shaped spaces. The first engaging element is held by a first retainer. The first retainer swings with respect to the outer member so that the first engaging element engages with or disengages from the cam surfaces. The second engaging element is held by a second retainer. The second retainer swings with respect to the outer member so that the second engaging element engages with or disengages from the cam surfaces.

When the first engaging element is engaged with a first cam surface by the first retainer and the second engaging element is engaged with a second cam surface by the second retainer, rotation of the inner member in both direction with respect to the outer member can be locked. Further, when the first engaging element is disengaged from the first cam surface by the first retainer and the second engaging element is disengaged from the second cam surface by the second retainer, the lock of the inner member with respect to the outer member can be released, that is, the inner member can idle in the both directions.

PRIOR ART DOCUMENT

Patent Document

The Patent Document 1 is JP-A 2008-057566

SUMMARY OF THE INVENTION

Problem to be Solved by the Invention

However, in a conventional two-way clutch, the first engaging element and the second engaging element are axially arranged, and there are two rows of the engaging elements in a side view orthogonal to an axial direction of the first engaging element and the second engaging element. Therefore, there is a problem that the two-way clutch becomes large in the axial direction.

Means for Solving the Problem

In order to solve the above problem, one aspect of the present invention is a two-way clutch including an outer member having an inner surface on which a first cam surface and a second cam surface forming a first wedge-shaped space and a second wedge-shaped space between the outer member and an inner member are formed, a first engaging element arranged in the first wedge-shaped space, a second engaging element arranged in the second wedge-shaped space, a first retainer that holds the first engaging element and is swingable with respect to the outer member so that the first engaging element engages with or disengages the first cam surface, and a second retainer separate from the first retainer that holds the second engaging element and is swingable with respect to the outer member so that the second engaging element engages with or disengages the second cam surface, wherein in a side view orthogonal to an axial direction of the first engaging element and the second engaging element, at least a part of the first engaging element and at least a part of the second engaging element overlap in the axial direction, the first retainer is configured to allow the second engaging element to swing with the second retainer, and the second retainer is configured to allow the first engaging element to swing with the first retainer.

EFFECT OF THE INVENTION

According to the present invention, since the at least a part of the first engaging element and the at least a part of the second engaging element overlap in the axial direction in the side view orthogonal to the axial direction of the first engaging element and the second engaging element, an axial size of the two-way clutch can be made compact.

MODE FOR CARRYING OUT THE INVENTION

Hereinafter, based on the accompanying drawings, the two-way clutch of the embodiment according to the present invention will be described in detail. However, the two-way clutch of the present invention can be embodied in various forms and is not limited to the embodiment described herein. The embodiment is provided with an intention that the disclosure of the specification is made sufficient to enable a person skilled in the art to fully understand the scope of the invention.

Figure 1:
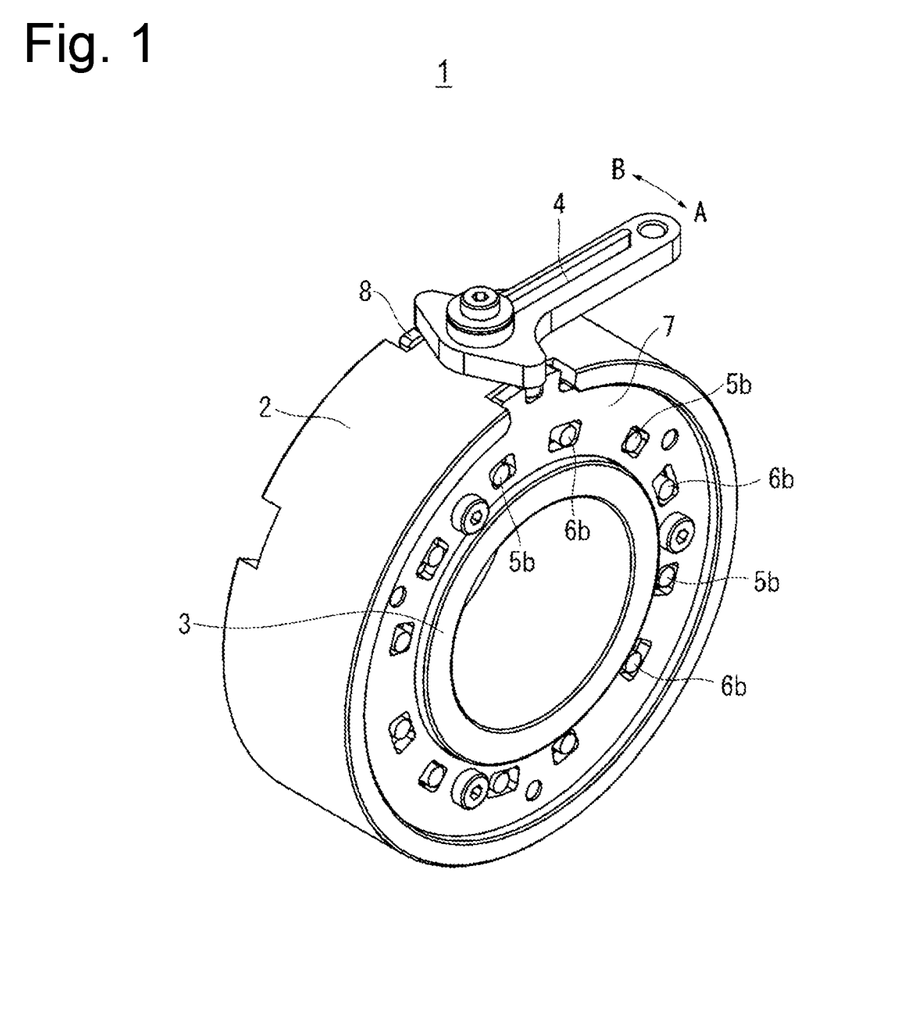
FIG. 1 is an external perspective view of a two-way clutch of one embodiment according to the present invention.

FIG. 1 shows an external perspective view of a two-way clutch 1 of one embodiment according to the present invention. The two-way clutch 1 of the present embodiment includes an outer ring 2 as an outer member, an inner ring 3 as an inner member, a group of first rollers 5 as a first engaging element (in FIG. 1, shafts 5b of the group of the first rollers 5 are shown), a group of second rollers 6 as a second engaging element (in FIG. 1, shafts 6b of the group of the second rollers 6 are shown), and a first retainer 7, a second retainer 8, and a lever 4.

The lever 4 is provided on the outer ring 2 so as to be swingable between a lock position A and a release position B. When the lever 4 is located at the lock position A, a rotation of the inner ring 3 with respect to the outer ring 2 in both directions (clockwise direction and counterclockwise direction) is locked. When the lever 4 is located at the release position B, the inner ring 3 idles in the both directions with respect to the outer ring 2.

Figure 2:
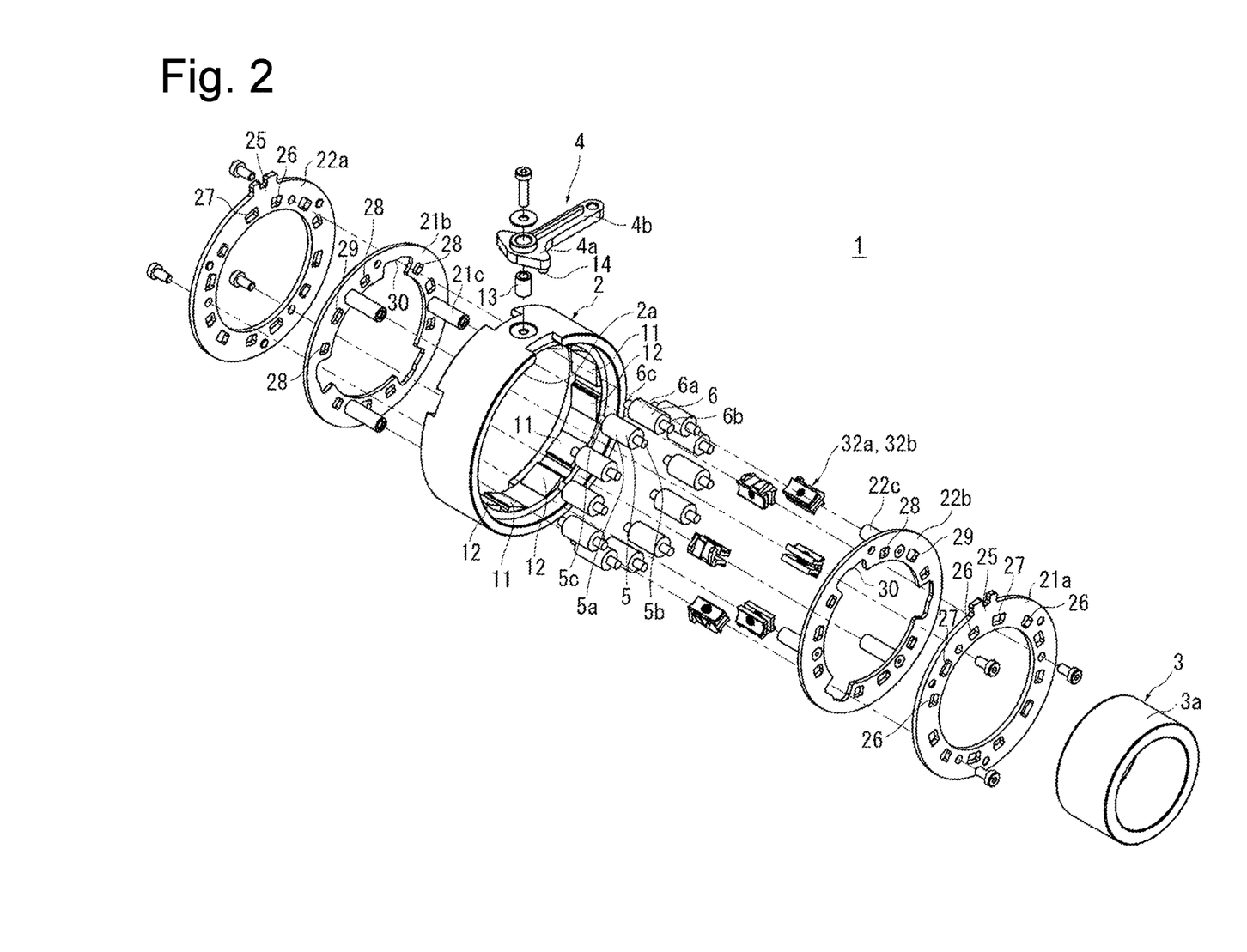
FIG. 2 is an exploded perspective view of the two-way clutch of the present embodiment.
Figure 3:
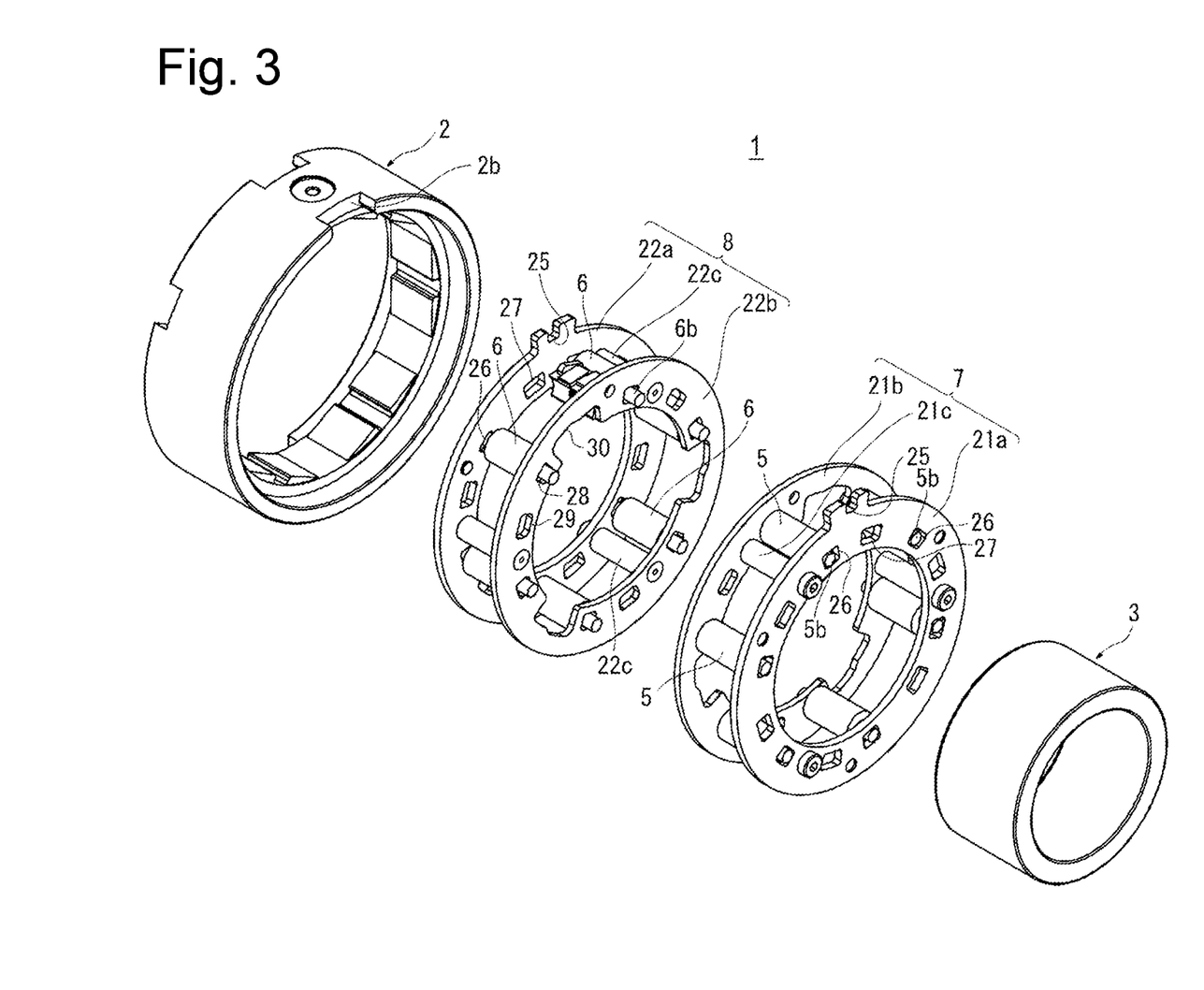
FIG. 3 is an exploded perspective view of the two-way clutch of the present embodiment (in a state that the first retainer and the second retainer are assembled).

FIG. 2 shows an exploded perspective view of the two-way clutch 1, and FIG. 3 shows a state in which the first retainer 7 and the second retainer 8 are assembled.

As shown in FIG. 2, first cam surfaces 11 and second cam surfaces 12 are alternately formed on an inner surface of the outer ring 2 in the circumferential direction. The plurality of the first cam surfaces 11 (six first cam surfaces in this embodiment) are equally arranged on the inner surface of the outer ring 2. The plurality of the second cam surfaces 12 (six second cam surfaces in this embodiment) are equally arranged on the inner surface of the outer ring 2. The adjacent first cam surface 11 and the second cam surface 12 are inclined in opposite directions to each other. Between the first cam surfaces 11 and a cylindrical outer surface 3a of the inner ring 3, a first wedge-shaped space Si is formed in which a width of one end in a circumferential direction is wide and a width of the other end in the circumferential direction is narrow (See FIG. 10(c)). Similarly, between the second cam surfaces 12 and the outer surface 3a of the inner ring 3, a second wedge-shaped space S2 is formed in which the width of the other end in the circumferential direction is wide and the width of the one end in the circumferential direction is narrow (See FIG. 10(c)). The first wedge-shaped space S1 and the second wedge-shaped space S2 are symmetrical. The first rollers 5 are arranged in the first wedge-shaped space S1. The second rollers 6 are arranged in the second wedge-shaped space S2.

As shown in FIG. 2, the lever 4 is attached to the outer ring 2 so as to be rotatable around a shaft 13. The lever 4 includes a base end portion 4a and a grip portion 4b extending in a tangential direction of the outer ring 2. At the base end portion 4a, a protrusion 14 that engages with the first retainer 7 is formed, and a protrusion that engages with the second retainer 8 is formed. When the lever 4 is swung around the shaft 13, the first retainer 7 (see FIG. 3) and the second retainer 8 (see FIG. 3) swing in opposite directions to each other.

As shown in FIG. 2, the first rollers 5 and the second rollers 6 are arranged alternately in the circumferential direction. The first rollers 5 and the second rollers 6 have the same shape. The first roller 5 includes a central large diameter portion 5a and shafts 5b and 5c at both ends. The shafts 5b and 5c have a smaller diameter than the large diameter portion 5a. Similarly, the second roller 6 includes a central large diameter portion 6a and shafts 6b and 6c at both ends in an axial direction thereof An axis of the first roller 5 and an axis of the second roller 6 are parallel to each other, and these are also parallel to an axis of the inner ring 3.

The first rollers 5 and the second rollers 6 are arranged in the circumferential direction on the outer surface 3a of the inner ring 3. In the side view orthogonal to the axial direction of the first roller 5 and the second roller 6, the adjacent first roller 5 and the second roller 6 overlap each other in the axial direction. However, as in the upper and lower first rollers 5 and second rollers 6 in FIG. 2, the first rollers 5 and the second rollers 6 may overlap in the axial direction and may be displaced in a vertical direction. Further, the entire first roller 5 and the entire second roller 6 may overlap in the axial direction, or at least a part of the first roller 5 and at least a part of the second roller 6 may overlap in the axial direction.

As shown in FIG. 3, the first rollers 5 are held by the first retainer 7. The first retainer 7 includes a pair of annular end plates 21a and 21b that support the shafts 5b and 5c at the both ends of the first roller 5 and a stud 21c interposed between the end plates 21a and 21b. The end plates 21a and 21b and the stud 21c are fixed by fixing means such as screws. An U-shaped fitting piece 25 is formed so as to project from the end plate 21a.

The first retainer 7 is rotatably fitted inside the outer ring 2 around a center of the outer ring 2. The fitting piece 25 fits into a notch 2b of the outer ring 2 and protrudes from the outer ring 2 in a radial direction. The protrusion 14 of the lever 4 fits into the fitting piece 25. The first retainer 7 can swing until the fitting piece 25 hits both walls of the notch 2b of the outer ring 2.

The end plate 21a has an annular shape. The end plate 21a is formed with support holes 26 into which the shafts 5b at one end of the first rollers 5 are inserted. The support holes 26 are equally arranged in the end plate 21a. As shown in the front view of FIG. 8(a), the support hole 26 has a substantially rectangular shape in the front view. A height of the support hole 26 (height in the radial direction) is substantially equal to the diameter of the shaft 5b. A circumferential length of the support hole 26 is larger than the diameter of the shaft 5b.

Figure 8:
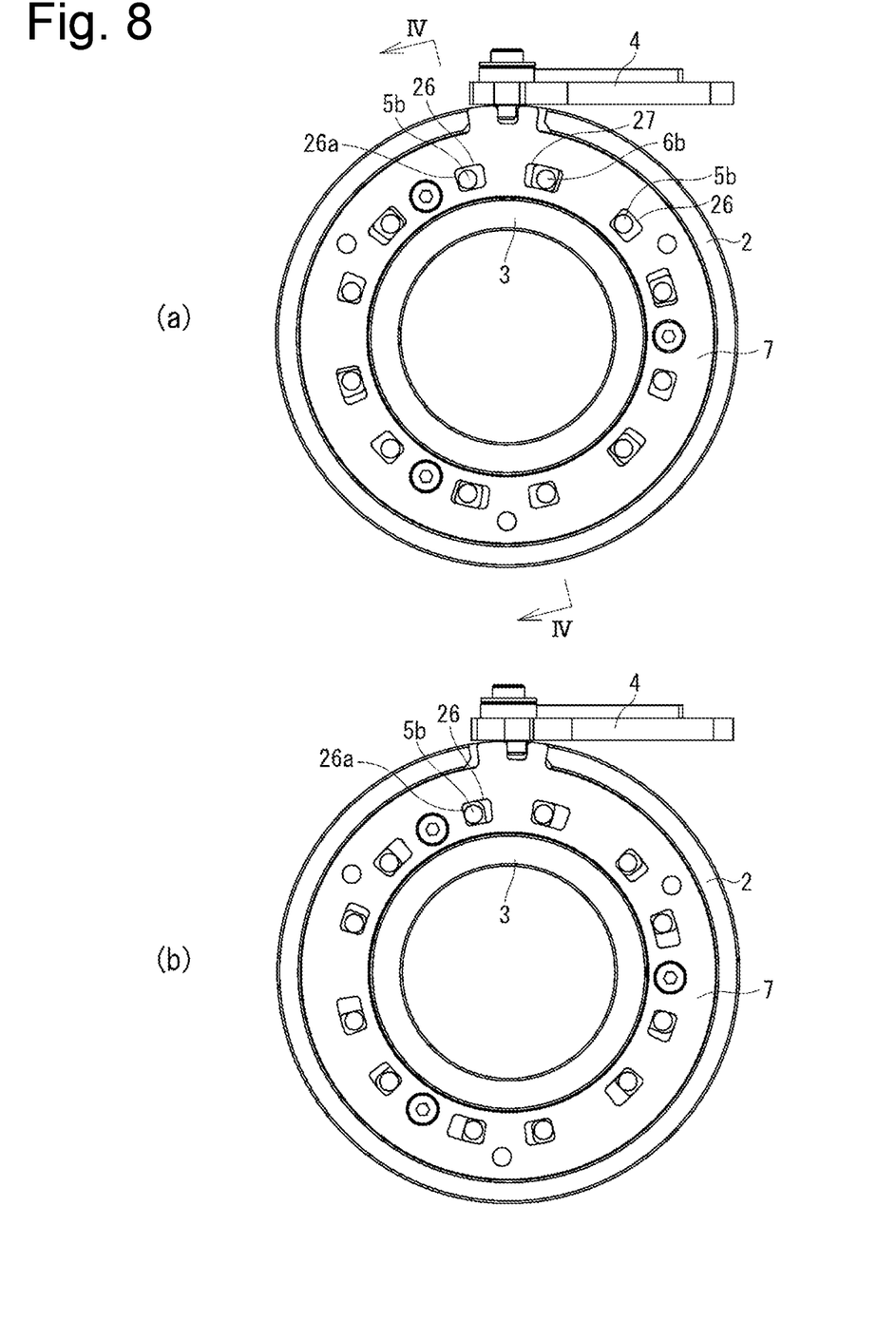
FIG. 8 is a front view of the two-way clutch (FIG. 8(a) shows a lock position of the first retainer, and FIG. 8(b) shows a release position of the first retainer)

As shown in FIG. 3, relief holes 27 as a relief portion are formed between the support holes 26. The shafts 6b at one end of the second rollers 6 are inserted into the relief holes 27. The relief hole 27 allows the shaft 6b of the second roller 6 to swing together with the second retainer 8. As shown in FIG. 8(a), the relief hole 27 has a substantially rectangular shape having a length in the circumferential direction longer than that of the support hole 26 in the front view.

As shown in FIG. 3, the end plate 21b also has an annular shape. As shown in FIG. 2, the end plate 21b is formed with support holes 28 into which the shafts 5c at the other end of the first rollers 5 are inserted. The support hole 28 faces the support hole 26. A shape of the support hole 28 is the same as that of the support hole 26.

Relief holes 29 or relief notches 30 are formed between the support holes 28 of the end plate 21b as a relief portion for the shafts 6c at the other end of the second rollers 6 to be inserted. The shaft 6c of the second roller 6 can swing in the relief hole 29 or the relief notch 30. The relief hole 29 faces the relief hole 27. The relief hole 29 has the same shape as the relief hole 27. The relief notch 30 is provided to avoid interference with the stud 22c of the second retainer 8.

As shown in FIG. 3, the second retainer 8 is separate from the first retainer 7. The second retainer 8 includes a pair of end plates 22a and 22b that support the shafts 6b and 6c at the both ends of the second roller 6 and a stud 22c interposed between the end plates 22a and 22b. The second retainer 8 has the same shape as the first retainer 7. If the first retainer 7 is rotated 180° around the vertical axis, it becomes the second retainer 8. Since a configuration of each part of the second retainer 8 is the same as the configuration of each part of the first retainer 7, the same reference numerals are given and detailed description thereof will be omitted.

Figure 4:
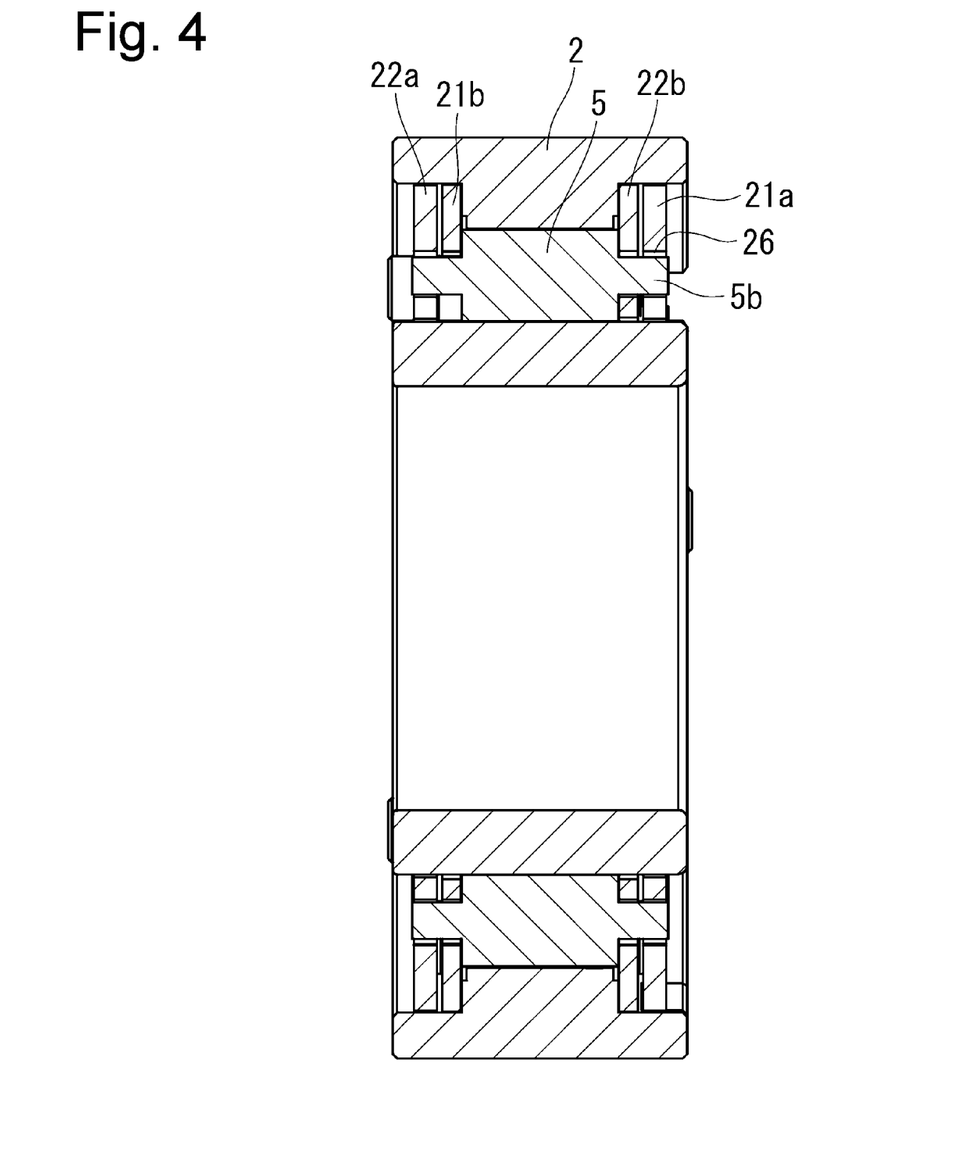
FIG. 4 is a cross-sectional view taken along line IV-IV of FIG. 8(a).

The second retainer 8 is rotatably fitted inside the outer ring 2 around the center of the outer ring 2. As shown in FIG. 4, when the first retainer 7 and the second retainer 8 are fitted to the outer ring 2, the end plate 21a of the first retainer 7 overlaps with the end plate 22b of the second retainer 8, and the end plate 21b of the first retainer 7 overlaps with the end plate 22a of the second retainer 8.

Figure 5:
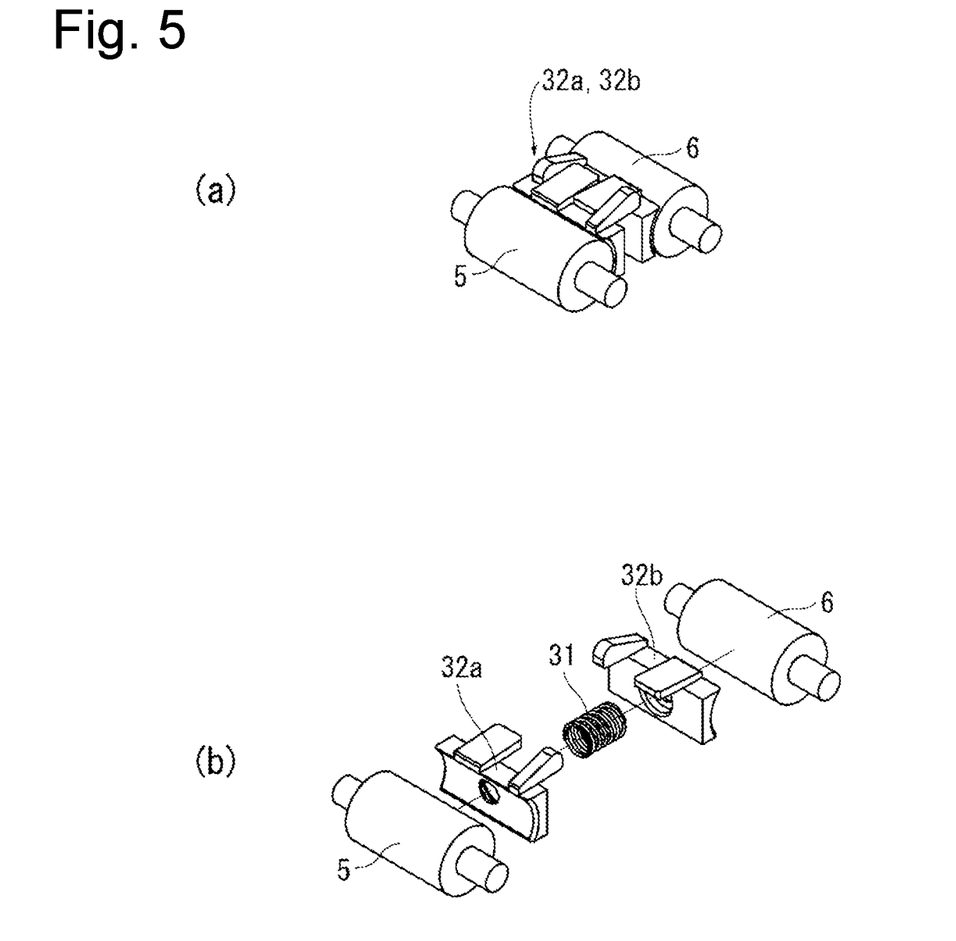
FIG. 5(a) is a perspective view of a spring holder.
FIG. 5(b) is an exploded perspective view of the spring holder.
Figure 6:
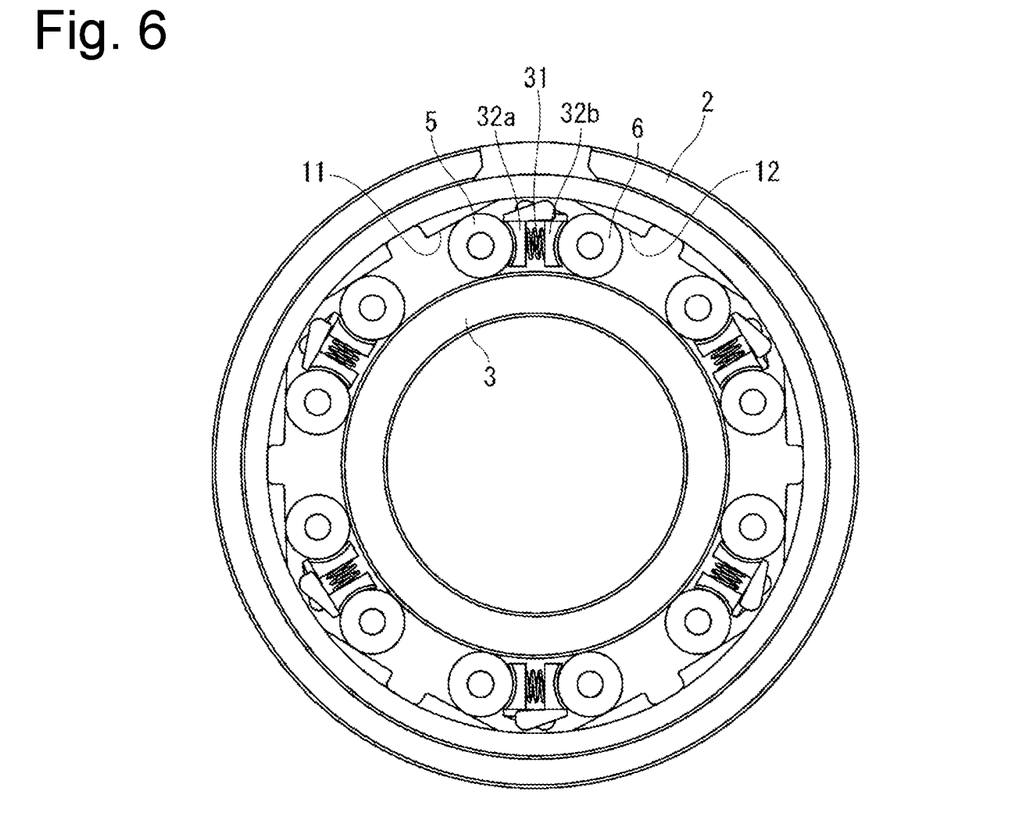
FIG. 6 is a front view of the two-way clutch in a state that the first retainer and the second retainer are removed.

As shown in FIG. 5(b), springs 31 are interposed between the adjacent first rollers 5 and second rollers 6. As shown in FIG. 6, the spring 31 energizes the first roller 5 to the first cam surface 11 and the second roller 6 to the second cam surface 12. The spring 31 is sandwiched between a pair of spring holders 32a and 32b. The pair of spring holders 32a and 32b can slide with each other so that the first roller 5 and the second roller 6 can approach and separate from each other. The spring holders 32a and 32b are provided to hold the spring 31 at a fixed position. If the spring 31 can be held at the fixed position, the spring holders 32a and 32b can be omitted.

Figure 7:
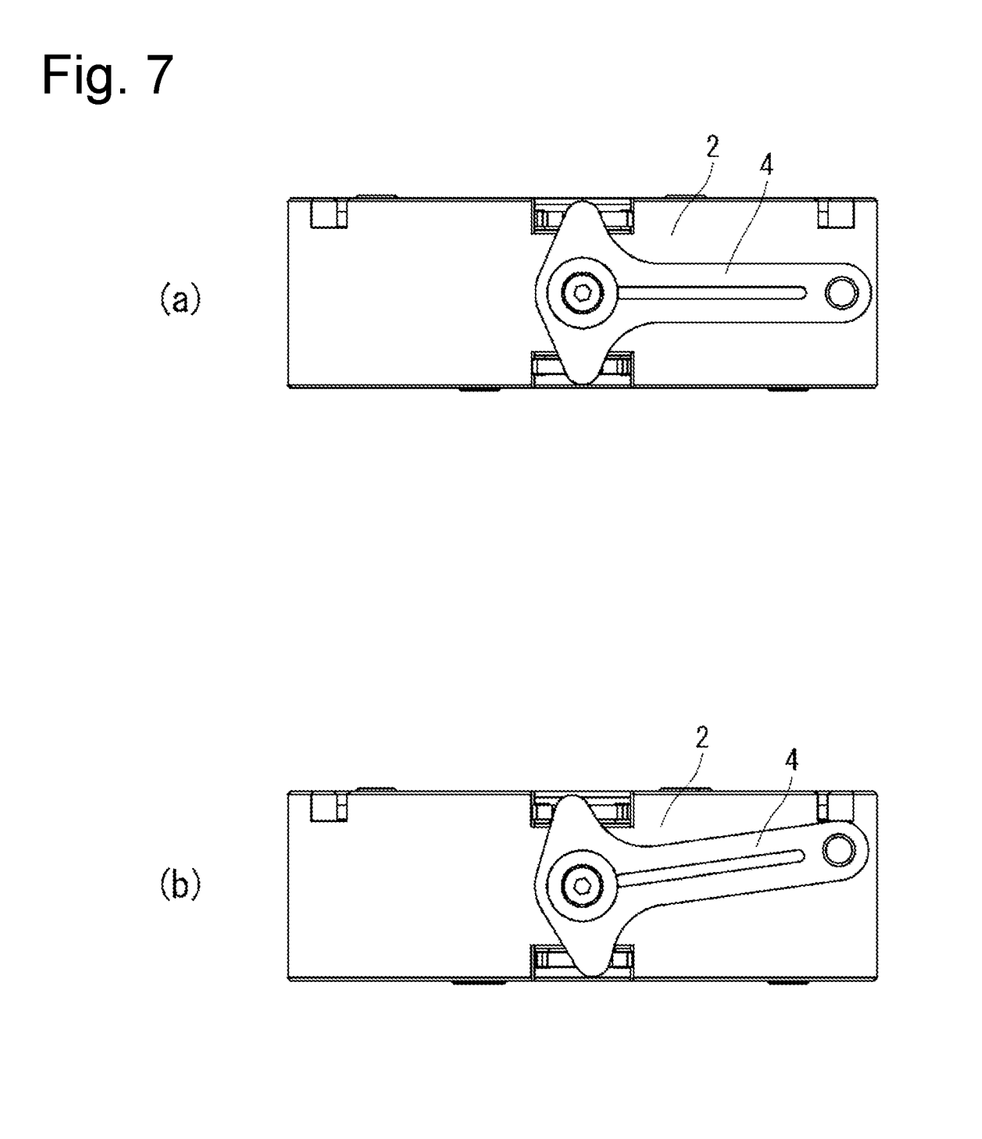
FIG. 7 is a plan view of the two-way clutch (FIG. 7(a) shows a lock position of a lever, and FIG. 7(b) shows a release position of the lever).

The operation of the two-way clutch 1 of the present embodiment will be described below. FIG. 7(a) shows the lock position of the lever 4, and FIG. 7(b) shows the release position of the lever 4. As described above, the lever 4 can swing between the lock position and the release position. When the lever 4 is located at the lock position, the rotation of the inner ring 3 in the both directions is locked. When the lever 4 is located at the release position, the inner ring 3 idles in the both directions.

Figure 9:
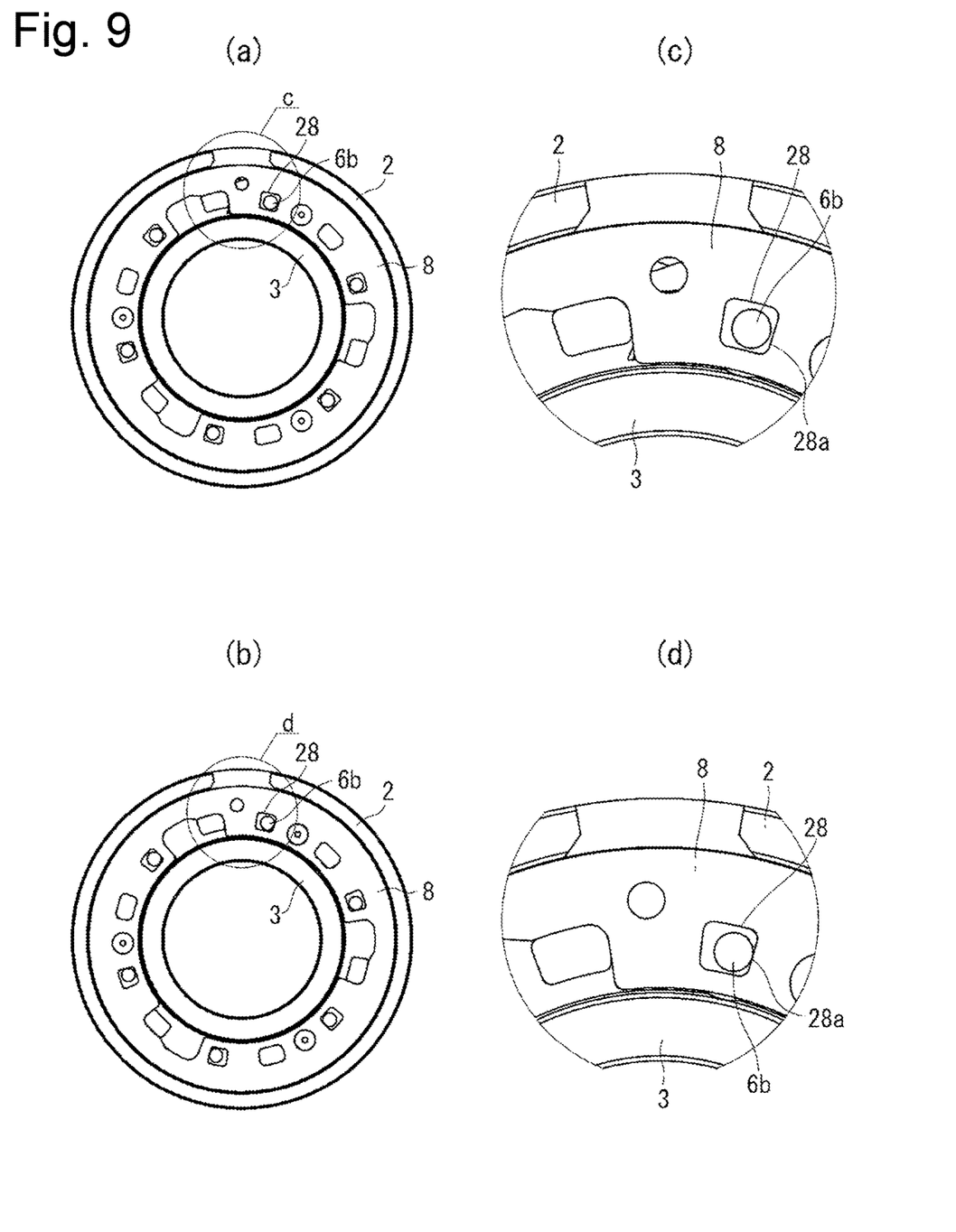
FIG. 9 is a front view of the two-way clutch in a state that the first retainer is removed (FIG. 9(a) shows a lock position of the second retainer, FIG. 9(b) shows a release position of the second retainer, FIG. 9(c) shows an enlarged view of part c of FIG. 9(a), and FIG. 9(d) shows an enlarged view of part d of FIG. 9(b)).

FIG. 8(a) shows a lock position of the first retainer 7, and FIG. 8(b) shows a release position of the first retainer 7. FIG. 9(a) shows a lock position of the second retainer 8, and FIG. 9(b) shows a release position of the second retainer 8. In the front view of the two-way clutch 1 of FIGS. 9(a) and 9(b), the first retainer 7 is removed to show the second retainer 8.

As shown in FIG. 8(a), when the first retainer 7 is located at the lock position, the first roller 5 is engaged with the first cam surface 11 of the outer ring 2 as shown in FIGS. 10(a) and 10(c). The counterclockwise rotation of the inner ring 3 is locked by the first roller 5. As shown in FIG. 8(a), when the first retainer 7 is located at the lock position, there is a slight gap between a wall 26a of the support hole 26 of the first retainer 7 and the shaft 5b of the first roller 5. The first roller 5 is energized to the first cam surface 11 by the spring 31.

Figure 10:
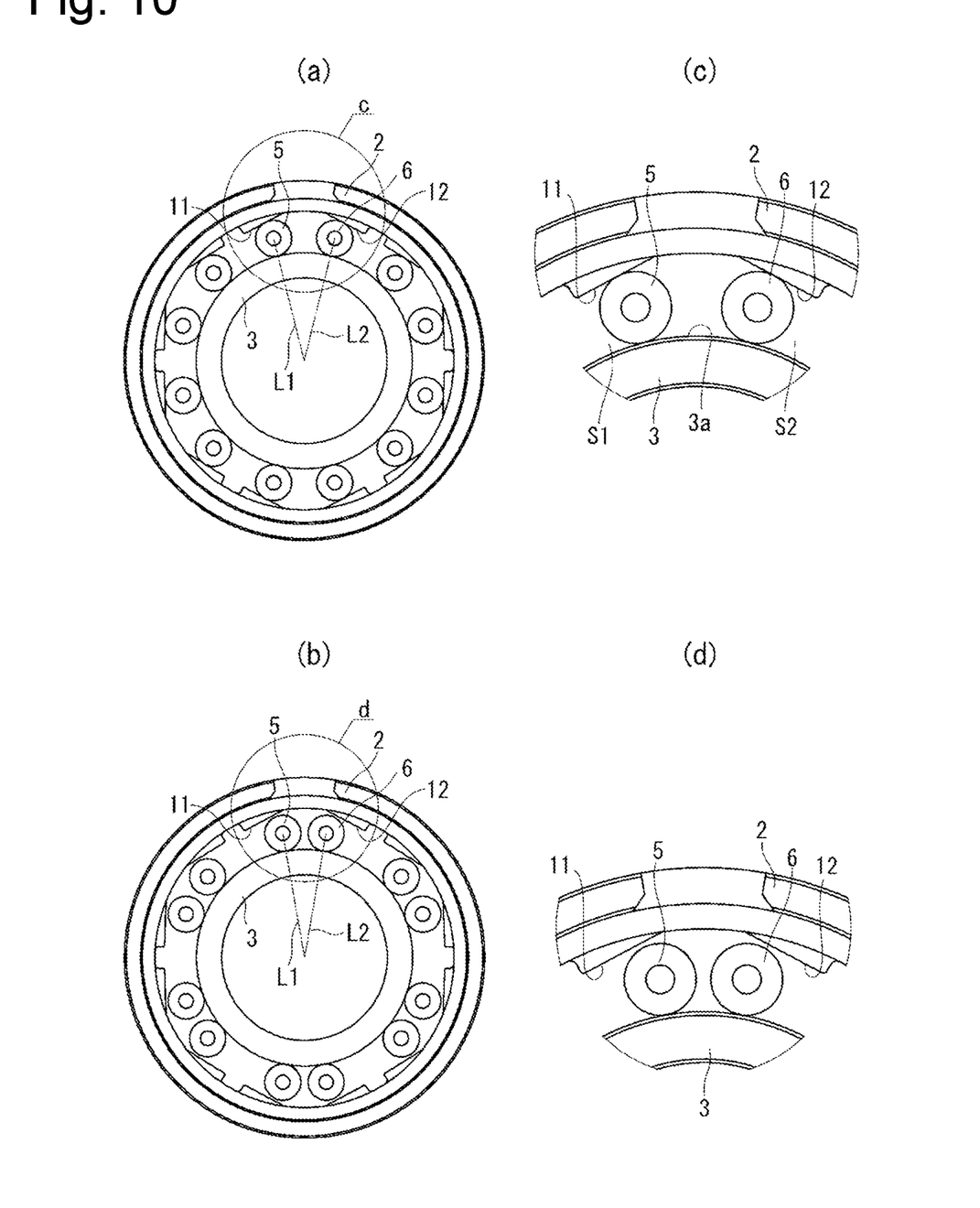
FIG. 10(a) is a front view of the two-way clutch showing only an outer ring, an inner ring, first rollers, and second rollers (FIG. 10(a) shows a state in which the first rollers and the second rollers are engaged with the first cam surface and the second cam surface, FIG. 10(b) shows a state in which the first rollers and the second rollers are disengaged, FIG. 10(c) shows an enlarged view of part c of FIG. 10(a), and FIG. 10(d) shows an enlarged view of part d of FIG. 10(b)).

Similarly, as shown in FIG. 9(a), when the second retainer 8 is located at the lock position, the second roller 6 is engaged with the second cam surface 12 of the outer ring 2 as shown in FIGS. 10(a) and 10(c) (see FIG. 10 (a)). The clockwise rotation of the inner ring 3 is locked by the second roller 6. Dash lines L1 and L2 in FIG. 10(a) show the contact angle lines of the first roller 5 and the second roller 6. As shown in FIG. 9(c), when the second retainer 8 is located at the lock position, there is a slight gap between a wall 28a of the support hole 28 of the second retainer 8 and the shaft 6b of the second roller 6. The second roller 6 is energized to the second cam surface 12 by the spring 31.

As shown in FIG. 7(b), when the lever 4 is swung from the lock position to the released position, the first retainer 7 and the second retainer 8 rotate in opposite directions to each other. Then, as shown in FIG. 8(b), the first retainer 7 swings from the lock position to the released position. When the first retainer 7 is located at the release position, the engagement between the first roller 5 and the first cam surface 11 is released as shown in FIGS. 10(b) and 10(d). Therefore, the inner ring 3 idles in the counterclockwise direction. As shown in FIG. 8(b), when the wall 26a of the support hole 26 of the first retainer 7 pushes the shaft 5b of the first roller 5 in the clockwise direction, the first roller 5 is separated from the first cam surface 11. Therefore, the inner ring 3 can idle in the counterclockwise direction.

Similarly, as shown in FIGS. 9(b) and 9(d), when the second retainer 8 is located at the release position, the engagement between the second roller 6 and the second cam surface 12 is released as shown in FIGS. 10(b) and 10(d). Therefore, the inner ring 3 idles in the clockwise direction. As shown in FIGS. 9(b) and 9(d), when the wall 28a of the support hole 28 of the second retainer 7 pushes the shaft 6b of the second roller 6 in the clockwise direction, the second roller 6 is separated from the second cam surface 12. Therefore, the inner ring 3 can idle in the clockwise direction.

An effect of the two-way clutch 1 of the present embodiment will be described below. In the side view, at least a part of the first roller 5 and at least a part of the second roller 6 overlap each other, so that the axial size of the two-way clutch 1 can be made compact.

Since the first retainer 7 has the support holes 26 and 28 into which the shafts 5b and 5c of the first roller 5 are inserted, the first retainer 7 can hold the first roller 5. Similarly, since the second retainer 8 has the support holes 26 and 28 into which the shafts 6b and 6c of the second roller 6 are inserted, the second retainer 8 can hold the second roller 6.

Since the first retainer 7 has the relief holes 27 and 29 or the relief notches 30, it is possible to allow the second roller 6 to swing with the second retainer 8. Similarly, since the second retainer 8 has the relief holes 27 and 29 or the relief notches 30, it is possible to allow the first roller 5 to swing with the first retainer 7.

Since the lever 4 for swinging the first retainer 7 and the second retainer 8 in the opposite directions to each other is provided, a lock state that locks the rotation in the both directions and an unlock state can be switched by the lever 4.

The spring 31 is interposed between the first roller 5 and the second roller 6. Therefore, even if the first retainer 7, the second retainer 8 and the support holes 26 and 28 thereof are not machined with high accuracy, the first roller 5 can be engaged with the first cam surface 11 and the second roller 6 can be engaged with the second cam surface 12.

Figure 11:
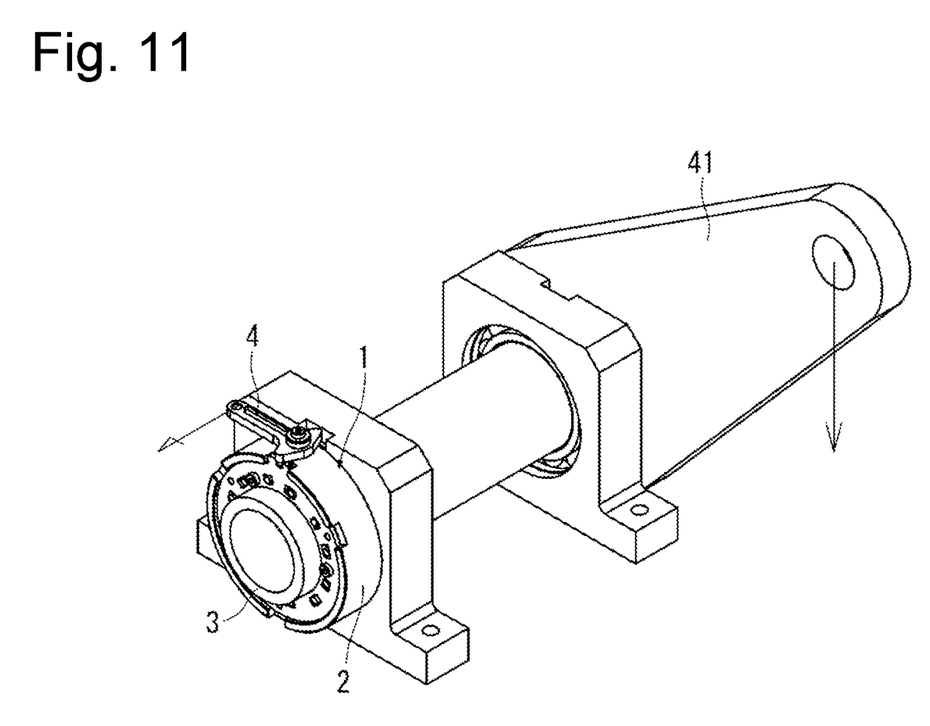
FIG. 11 is a perspective view showing an example of an application of the two-way clutch of the present embodiment.

FIG. 11 shows an example in which the two-way clutch 1 of the present embodiment is used as a positioning device. By swinging the lever 4 to the release position, a rotation position of an arm 41 connected to the inner ring 3 can be adjusted. After the adjustment, the rotation position of the arm 41 can be locked by swinging the lever 4 to the lock position.

It should be noted that the present invention is not limited to being embodied in the above-described embodiment, and can be modified to other embodiments within the scope of the gist of the present invention.

The application of the two-way clutch of the present embodiment is not limited to the positioning device shown in FIG. 11, and may be used as a clutch (clutch for transmitting or releasing torque) of a drive system of various machines.

In the above embodiment, the first retainer and the second retainer are swung by the lever, but the first retainer and the second retainer may be swung by a driving device such as a motor or an electromagnetic solenoid or may be swung by utilizing the torque acting on the outer ring or the inner ring.

In the above embodiment, the spring is interposed between the first roller and the second roller, but the spring may be interposed between the first retainer and the second retainer. Further, the first roller and the second roller may be returned to a neutral position by the spring.

In the above embodiment, the lock state for locking the rotation of the inner ring in the both directions and the unlock state for releasing the lock of the inner ring in the both directions are switched. However, at least of two of the lock state for locking the rotation of the inner ring in the both directions, a lock state for locking the rotation of the inner ring only in the clockwise directions, a lock state for locking the rotation of the inner ring only in the counterclockwise directions, and the unlock state for releasing the lock of the inner ring in the both directions may be switched.

The present specification is based on patent application No. JP 2019-052271 filed on Mar. 20, 2019. The contents of this application are incorporated herein in its entirety.

DESCRIPTION OF REFERENCES

1 . . . Two-way clutch
2 . . . Outer ring (outer member)
3 . . . Inner ring (inner member)
4 . . . lever
5 . . . First roller (first engaging element)
5b, 5c . . . Shaft of the first roller (shaft of the first engaging element)
6 . . . Second roller (second engaging element)
6b, 6c . . . Shaft of the second roller (shaft of the second engaging element)
7 . . . First retainer
8 . . . Second retainer
11 . . . First cam surface
12 . . . Second cam surface
26, 28 . . . Support hole
27, 29 . . . Relief hole (relief portion)
30 . . . Relief notch (relief portion)
31 . . . Spring
51 . . . First wedge-shaped space
S2 . . . Second wedge-shaped space

What is claimed is:

1. A two-way clutch comprising:
an outer member having an inner surface on which a first cam surface and a second cam surface forming a first wedge-shaped space and a second wedge-shaped space between the outer member and an inner member are formed,
a first engaging element arranged in the first wedge-shaped space,
a second engaging element arranged in the second wedge-shaped space,
a first retainer that holds the first engaging element and is swingable with respect to the outer member so that the first engaging element engages with or disengages the first cam surface, and
a second retainer separate from the first retainer that holds the second engaging element and is swingable with respect to the outer member so that the second engaging element engages with or disengages the second cam surface,
wherein in a side view orthogonal to an axial direction of the first engaging element and the second engaging element, at least a part of the first engaging element and at least a part of the second engaging element overlap in the axial direction,
wherein the first retainer is configured to allow the second engaging element to swing with the second retainer, and
wherein the second retainer is configured to allow the first engaging element to swing with the first retainer.

2. The two-way clutch as claimed in claim 1, wherein the first retainer has a support hole into which a shaft at an end of the first engaging element is inserted, and the second retainer has a support hole into which a shaft at an end of the second engaging element is inserted.

3. The two-way clutch as claimed in claim 2, wherein the first retainer has a relief portion that allows the shaft of the second engaging element to swing with the second retainer, and the second retainer has a relief portion that allows the shaft of the first engaging element to swing with the first retainer.

4. The two-way clutch as claimed in claim 3, wherein the two-way clutch is provided with a lever that swings the first retainer and the second retainer in opposite directions to each other.

5. The two-way clutch as claimed in claim 4, wherein a spring that energizes the first engaging element to the first cam surface and the second engaging element to the second cam surface is provided between the first engaging element and the second engaging element.

6. The two-way clutch as claimed in claim 3, wherein a spring that energizes the first engaging element to the first cam surface and the second engaging element to the second cam surface is provided between the first engaging element and the second engaging element.

7. The two-way clutch as claimed in claim 2, wherein the two-way clutch is provided with a lever that swings the first retainer and the second retainer in opposite directions to each other.

8. The two-way clutch as claimed in claim 7, wherein a spring that energizes the first engaging element to the first cam surface and the second engaging element to the second cam surface is provided between the first engaging element and the second engaging element.

9. The two-way clutch as claimed in claim 2, wherein a spring that energizes the first engaging element to the first cam surface and the second engaging element to the second cam surface is provided between the first engaging element and the second engaging element.

10. The two-way clutch as claimed in claim 1, wherein the two-way clutch is provided with a lever that swings the first retainer and the second retainer in opposite directions to each other.

11. The two-way clutch as claimed in claim 10, wherein a spring that energizes the first engaging element to the first cam surface and the second engaging element to the second cam surface is provided between the first engaging element and the second engaging element.

12. The two-way clutch as claimed in claim 1, wherein a spring that energizes the first engaging element to the first cam surface and the second engaging element to the second cam surface is provided between the first engaging element and the second engaging element.

\* \* \* \* \*